United States Patent Office 2,695,851
Patented Nov. 30, 1954

2,695,851

ARTIFICIALLY COLORED ROOFING GRANULES, METHOD OF MAKING SAME, AND A SHEET BODY HAVING AN ADHERENT SURFACING OF SAID GRANULES

James R. Lodge, St. Paul, Minn., assignor to Minnesota Mining & Manufacturing Company, St. Paul, Minn., a corporation of Delaware No Drawing. Application March 28, 1949, Serial No. 84,014

11 Claims. (Cl. 117—27)

This invention concerns improvements in the manufacture of artificially colored granules and more particularly artificially colored roofing granules intended for use in the decoration and protection of asphalt roofing, siding or the like.

Methods have long been known for the artificial coloring of roofing granules, consisting of crushed and screened minerals, in which the granules are coated with a suitable pigment in an inorganic bond. Preferably this bond is water insoluble and highly adherent to the base granule. In carrying out these processes the granules are mixed with a pigment and a soluble silicate solution until a thorough coating of the granules is obtained and the soluble silicate is then insolubilized. The soluble silicate, usually sodium silicate, is converted into the insoluble state by subjecting the coated granules to heat treatment, e. g. roasting temperatures; by chemical action; or by a combination of chemical action and heat treatment. Highly satisfactory granules have been made by all of these methods. Insolubilization of the silicate granule coating at low temperatures affords some advantage over the high temperature processes, not only in respect to lower fuel cost, but also in widening the choice of pigments that may be used and in permitting the employment of certain pigments, such as organic pigments, which are deleteriously affected at high temperatures.

The present invention may be employed in respect to any of these methods of insolubilizing the silicate granule coating, e. g. the high temperature process, the chemical insolubilizing process and the combined process of chemical action and heat treatment. The present invention relates particularly to light-colored granules, such as white granules or buff-colored granules. The problem of producing satisfactory light-colored granules that are clear and have a high color intensity has long been a troublesome one to the roofing granule industry. The base granules that are customarily used comprise any of a rather wide class of relatively porous or nonporous and weather-resistant mineral. The difficulty lies in applying a light-colored coating of sufficient thickness to hide the dark color of the base granule and at the same time provide a film which is highly adherent to the base granule and resistant to attrition, as contrasted with a porous or spongy or impermanent film such as might be obtained by prior art methods if a thick coating film is applied to conceal completely the base granule.

A further difficulty is presented by the fact that the required ratio of ingredients is usually such that the viscosity or other physical properties of the mixture of bond and pigment is not suitable for effective or economical application. The brightness of the light-colored granules is in direct proportion to the increase in opacity over a dark base surface. Uncoated fired clay granules have been employed when light-colored granules are desired, but such granules are not entirely satisfactory due to the inherent porosity of the fired clay.

I have found that the above limitations in the production of light-colored granules may be avoided by means of the compositions and methods of my invention. I have obtained artificially colored roofing granules having a high intensity of color in the lighter shades. The colored coatings are firmly bonded to the base granules, and are resistant to attrition and to both thermal and mechanical shock. They are substantially water-insoluble and nonalkaline and the granules retain their attractive appearance and firm bond to the plastic stratum under severe weathering conditions. The liquid or viscous coating compositions employed in making the improved light-colored granules may be applied to the base granules under somewhat varying conditions without premature thickening or loss of film-forming properties of the pigment-containing composition.

These several advantages, both in the process and in the resulting product, are obtained by utilizing a coating composition including as the bonding and film-forming constituent a mixture of a pigment, a soluble alkali silicate and hydrated alumina. I have found that hydrated alumina when used in combination with a light-colored, opaque pigment, such as titanium dioxide, in the production of sodium silicate coated roofing granules produces considerably lighter and brighter granules than can be produced with a like amount of titanium dioxide in the absence of hydrated alumina. Reflectance measurements of both white and cream buff granules on a photovolt photoelectric reflection meter, manufactured by the Photovolt Corp. of New York City, clearly bring out the different in brightness obtained by employing my invention. Two batches of granules of each color were tested. Both batches were identical in respect to the base granule, coating composition and method of coating except that hydrated alumina was used in one batch of each color and omitted in the other batch. These measurements showed that the used of hydrated alumina in the white granules increased the apparent luminous reflectance (or lightness) by more than 19% over the white granules which did not contain hydrated alumina. In the case of the cream buff granules the increase was more than 24%.

Hydrated alumina has rather unique properties in the production of light-colored roofing granules in that it can be used in fairly large quantities in silicate coatings without appreciably weakening the bond. I have further found that hydrated alumina has a far greater lightening effect on the resultant granule than has kaolin, for example, and that increasing the quantity of hydrated alumina in the soluble silicate film does not weaken the bond, as occurs by increasing the quantity of kaolin. Much brighter granules, in both the light and dark shades, can be obtained by employing finely-divided hydrated alumina with the pigment than by using such pigment extenders as zinc oxide, talc, calcium carbonate, calcium silicate, diatomaceous earth, bentonite, kaolin or other clays.

Hydrated alumina may be satisfactorily employed as a lightening agent in either the relatively high temperature silicate-clay process such as disclosed in the Jewett Patent No. 2,378,927 in which a soluble silicate and an insolubilizing agent such as clay, cryolite, feldspar, aluminum fluoride, sodium fluo-silicate or the like are heated to temperatures of approximately 850° F.–1050° F. or higher, or in the low temperature processes in which the silicate is largely insolubilized by chemical action, such as the so-called "pickle" processes generally exemplified by the Denning Patent No. 1,898,345 which discloses the use of either calcium or magnesium chloride or aluminum sulphate as the insolubilizing agent. The process would also be beneficial in producing coatings of a light color by means of the phosphate processes known to the art.

My use of hydrated alumina has not been limited to white granules. It has also been used very successfully in the production of light cream, buff-colored granules. In this type of granule the coating generally comprises a mixture of hydrated alumina, titanium dioxide or other suitable white pigments such as zinc oxide or white lead, yellow iron hydrate, and a red toner, such as burnt sienna or red iron oxide, in a sodium silicate bond. The process in this case is preferably of the low temperature, e. g. 400° F.—chemical type because of the instability of the yellow iron pigment at higher temperatures. The invention also has considerable utility in the manufacture of artificially coated granules of the darker shades, such as red or green, in increasing the brightness of these colors without weakening the bond.

Not all samples of hydrated alumina ($Al_2O_3 \cdot 3H_2O$) which I have tested have been found to be equally effective in producing the improved granules of my invention. Highly satisfactory results have been obtained by employing aluminum hydrate produced by the Bayer process, referred to as alpha-alumina trihydrate having an average particle size of .5 to 1.2 microns. Commercial forms of this type of hydrated alumina are made by the Aluminum Company of America under the designation C-730 hydrated alumina and XC-7300. The coarser grades of aluminum hydrate of about 325 mesh or about 40 microns are not as suitable as the smaller particle size. The so-called "light aluminum hydrate," which usually contains some sulphate and is principally used in the printing ink industry, has a somewhat detrimental effect upon the bond and is not as satisfactory as the pure alumina trihydrate.

Aqueous sodium silicate is the preferred alkali silicate, due to its availability and economy, although equivalent material such as potassium silicate may be used. The preferred grade of sodium silicate has a ratio of $Na_2O$ to $SiO_2$ of 1:2 to 1:3.25, e. g. a silicate having a ratio of $Na_2O$ to $SiO_2$ of 1:2.84, a gravity of 47° Baumé, and a solids content of 40–42%. A commercial example of a sodium silicate of this type is the "K" brand sodium silicate currently sold by the Philadelphia Quartz Company. Variations in the alkalinity of the silicate are permissible, but increased alkalinity increases the difficulty of insolubilizing and provides in some cases a small percentage of undesirable soluble alkali in the final product, while increased $SiO_2$ content reduces the film-forming properties, as well as the concentration, of the silicate.

As a base granule I may employ any of a rather wide class of relatively porous or relatively nonporous and weather-resistant mineral. Examples of relatively porous material are trap rocks and slates. Examples of relatively nonporous minerals are argillite or greystone (such as the large greystone deposits located about five miles north of Wausau, Wisconsin) greenstone, quartz or quartzite, certain granites, etc.

In preparing artificially colored roofing granules in accordance with the invention, the natural mineral is crushed and screened to the desired size (e. g. so as to pass a "10-mesh" screen and be retained on a "35-mesh" screen. The following formulas, in which the weight of ingredients in pounds is sufficient for the treatment of one ton of quartzite, argillite or greystone, may be employed for producing light-colored granules.

*Formula No. 1—White granules*

| | Pounds |
|---|---|
| Titanium dioxide | 50 |
| Hydrated alumina | 30 |
| Burnt Sienna | 0.3 |
| "K" brand aqueous sodium silicate | 40 |
| Water | 40 |

The granules may be coated with the above ingredients in a tumbling-barrel type of mixer. Preferably the sodium silicate solution and water are first added, followed by the pigments, and finally by the hydrated alumina. The uncoated granules are preferably initially fired at a temperature of approximately 110–130° F. and air is circulated through the mixture during the mixing operation until the total moisture content has been reduced sufficiently to make the mass of granules free-flowing. It is desirable that the raw mix be pre-dried before firing; otherwise the coating is physically weak and may become chalky. The granules are then fired, preferably in a rotary kiln, at a temperature of approximately 380–400° F. This temperature is normally maintained for from about five to twenty minutes depending on the size of the kiln, and other factors, to dehydrate more completely the silicate coating. The granules are then cooled, for example, in a rotary tube type of cooler. To aid in cooling the granules, and also to eliminate any last traces of alkalinity, a dilute solution of ammonium chloride containing about 6 pounds of the salt per ton of granules may be sprayed on the granules in the rotary cooler; the residual heat in the granules is at this point just sufficient to evaporate the water thus added and also to remove any ammonia liberated from the ammonium chloride by reaction with residual alkali. The granules may then be oiled for the purpose of increasing their adherence to asphalt in the presence of water.

*Formula No. 2—White granules*

| | Pounds |
|---|---|
| Titanium dioxide | 50 |
| Hydrated alumina | 20 |
| Kaolin | 16 |
| Cryolite | 4 |
| "K" brand aqueous sodium silicate | 60 |
| Water | 40 |

The silicate solution, water, pigment, kaolin and hydrated alumina are added to the granules, mixed and pre-dried, as in Formula No. 1. The granules are fired in a rotary kiln at 1000° F. for five to thirty minutes depending upon the size of the kiln. When tested they show substantially no alkalinity, soluble salts, or blooming, and have excellent resistance to the 18-hour boil test.

*Formula No. 3—Cream buff granules*

| | Pounds |
|---|---|
| Titanium dioxide | 35 |
| Hydrated alumina | 18.5 |
| Ferrite yellow (a yellow iron hydrate pigment) | 5 |
| Burnt sienna | 1.6 |
| "K" brand aqueous sodium silicate | 40 |
| Water | 35 |

The granules are treated with this composition as described in connection with the previous formulas and are fired at approximately 380° F. after pre-drying. They may be sprayed with 6 pounds of ammonium chloride (per ton of granules) as a dilute solution as a final treatment to eliminate any residual alkalinity. The product is substantially free of alkalinity, exhibits no blooming, and shows no appreciable loss of color in the 18-hour boil test.

The pigments of Formula No. 3 produce a buff color on the finished granule when fired at, or not much above, 380° F. At higher temperatures, beginning even as low as 450–500° F., ferrite yellow is converted to a reddish oxide; the red color becomes quite intense upon heating the granules to 600–700° F. Granules prepared according to the above formula and at the firing temperature indicated, withstand the most severe tests, including vigorous boiling in water for 18 hours with substantially no loss of color intensity.

Other pigments may be substituted for the pigments indicated in the above formulas, such as red iron oxide pigments. However, the improvement has its greatest utility in producing light-colored granules. An improvement will also take place in using hydrated alumina with white lead, zinc oxide or other standard white pigments. As previously set forth, hydrated alumina having an average particle size of .5 to 1.2 microns was employed in the above formulae. Hydrated alumina having a particle size of about 40 microns has not produced as satisfactory results as in using the smaller particles.

The above compositions have been described as suitable for the coating of greystone, quartzite and similar dense granules of a particular size range. It will be obvious that many other varieties and sizes of granules may be substituted, and that modifications in solids content, pigment content and total amount of coating composition may be made, depending on the total surface area, porosity, color, reactivity and other properties of such substituted granules. The invention may also be employed in coating tile or slabs to provide an insoluble well-bonded, light-colored surface coating.

What I claim is:

1. Light-colored roofing granules comprising a mineral base granule coated with a light colored pigment and finely-divided hydrated alumina of an average particle size less than 40 microns, as a lightening agent, bonded in a weather-resisting and water-insoluble silicate matrix, the pigmented coating being firmly bonded to surfaces of the base granule.

2. Light-colored roofing granules comprising a mineral base granule coated with a bloom-resisting and water-insoluble in situ formed surface coating, said coating including a titanium dioxide pigment and finely-divided hydrated alumina, of an average particle size of the order of 0.5–1.2 microns, as a lightening agent and being weather-resisting and firmly bonded to said mineral base granule.

3. Artificially colored granules comprising a mineral base granule coated with a pigment and finely-divided hydrated alumina, smaller than 325 mesh, as a lightening agent, said coating being bonded to said granule by a weather-resisting and water-insoluble silicate matrix.

4. As a new article of manufacture, mineral roofing granules comprising an opaque base surface-coated with a mixture of a titanium dioxide pigment and a lightening agent of finely divided hydrated alumina, of an average particle size less than 40 microns, dispersed in a substantially water-insoluble inorganic silicate film resulting from the insolubilizing of sodium silicate.

5. Artificially colored roofing granules having a well-bonded, substantially nonalkaline and water-insoluble, colored surface-coating comprising a heat-sensitive pigment which exhibits permanent change of color when heated above a temperature of the order of 600° F., finely-divided hydrated alumina, of an average particle size of the order of 0.5-1.2 microns, and an inorganic bond, said bond consisting essentially of an insolubilized alkali silicate.

6. Artificially colored granules having a well-bonded, substantially nonalkaline and water-insoluble, colored surface-coating comprising titanium dioxide, finely-divided hydrated alumina adapted to pass through a 325-mesh screen and an inorganic bond, said bond consisting essentially of an insolubilized alkali silicate.

7. A composite sheet body for roofing and like purposes comprising a plastic stratum and an adherent surfacing for the same consisting of artificially colored granules as defined in claim 1.

8. A composite sheet body for roofing and like purposes comprising a plastic stratum and an adherent surfacing for the same consisting of artificially colored granules as defined in claim 3.

9. Method of manufacturing light-colored roofing granules of high color intensity comprising forming on the base granules a coating of a stable film-forming composition comprising essentially a pigment, an alkali silicate solution, finely-divided hydrated alumina, of an average particle size less than 40 microns, and an insolubilizing agent comprising a member of the group consisting of clay, cryolite, feldspar, aluminum fluoride and sodium fluo-silicate, and heating the coated granules to a temperature not substantially above 1000° F. to react the bonding composition to a substantially nonalkaline condition.

10. Method for manufacturing artificially colored roofing granules comprising coating the base granules with a film-forming composition comprising a pigment finely-divided hydrated alumina of an average particle size of the order of 0.5-1.2 microns, and an inorganic bonding composition, said bonding composition consisting essentially of sodium silicate solution and a clay and heating the coated granules to a temperature sufficient to react the bonding composition to a substantially nonalkaline condition but insufficient to produce deleterious change in the color of the pigment.

11. Artificially colored roofing granules comprising lithic base granules and weather-resistant, unfused, light-fast, light-colored surface coatings firmly bonded on said base granules, said surface coatings being produced in situ on surfaces of said granules by heat-reacting at temperatures not substantially above 1000° F., a coating composition including a pigment, finely-divided hydrated alumina, adapted to pass a 325-mesh screen, aqueous alkali metal silicate, and an insolubilizing reactant therefor comprising a member of the group consisting of clay, cryolite, feldspar, aluminum fluoride and sodium fluo-silicate.

References Cited in the file of this patent

UNITED STATES PATENTS

| Number | Name | Date |
| --- | --- | --- |
| 2,092,567 | Wright | Sept. 7, 1937 |
| 2,094,452 | Hillers | Sept. 28, 1937 |
| 2,114,692 | Ward | Apr. 19, 1938 |
| 2,215,600 | Veasey | Sept. 24, 1940 |
| 2,331,868 | Swenson | Oct. 12, 1943 |
| 2,333,662 | McCord et al. | Nov. 9, 1943 |
| 2,346,322 | Nelson | Apr. 11, 1944 |
| 2,350,030 | Greider | May 30, 1944 |
| 2,378,790 | Robertson | June 19, 1945 |
| 2,379,358 | Jewett | June 26, 1945 |
| 2,417,058 | Buzzell | Mar. 11, 1947 |
| 2,422,927 | Reynolds | June 24, 1947 |
| 2,439,650 | Cuno | Apr. 13, 1948 |
| 2,553,604 | Pole | May 22, 1951 |

FOREIGN PATENTS

| Number | Country | Date |
| --- | --- | --- |
| 576,974 | Great Britain | Apr. 30, 1946 |

OTHER REFERENCES

Paint and Varnish Technology, Fisher 9-48 (only page 61 relied on).